US012529997B2

(12) United States Patent
Vincent et al.

(10) Patent No.: US 12,529,997 B2
(45) Date of Patent: Jan. 20, 2026

(54) FUNCTIONAL MECHANICAL PART

(71) Applicant: The Swatch Group Research and Development Ltd, Marin (CH)

(72) Inventors: Christophe Vincent, Montperreux (FR); Adrien Cornille, Villars-le-Grand (CH)

(73) Assignee: The Swatch Group Research and Development Ltd, Marin (CH)

( * ) Notice: Subject to any disclaimer, the term of this patent is extended or adjusted under 35 U.S.C. 154(b) by 303 days.

(21) Appl. No.: 18/366,825

(22) Filed: Aug. 8, 2023

(65) Prior Publication Data

US 2024/0201628 A1 Jun. 20, 2024

(30) Foreign Application Priority Data

Dec. 19, 2022 (EP) .................................... 22214742

(51) Int. Cl.
*G04B 15/14* (2006.01)
*C08G 63/672* (2006.01)

(52) U.S. Cl.
CPC ........... *G04B 15/14* (2013.01); *C08G 63/672* (2013.01)

(58) Field of Classification Search
CPC ...... G04B 15/14; G04B 13/02; C08G 63/672; F16H 55/00
USPC .......................................................... 368/132
See application file for complete search history.

(56) References Cited

U.S. PATENT DOCUMENTS

2012/0026845 A1* 2/2012 Richard ................. G04B 15/14 368/127
2013/0036599 A1* 2/2013 Queval .................. G04B 15/06 29/527.1
2018/0335078 A1* 11/2018 Andersson .......... E05D 15/0652

FOREIGN PATENT DOCUMENTS

CH 334708 A 12/1958
WO WO-2021048336 A1 * 3/2021 ......... B65D 47/0838

OTHER PUBLICATIONS

Damijan Zorko et al., "An investigation on the potential of bio-based polymers for use in polymer gear transmissions", Polymer Testing, 2021, pp. 1-13, vol. 93.
European Search Report for 22 21 4742 dated, May 9, 2023.

* cited by examiner

*Primary Examiner* — Regis J Betsch
*Assistant Examiner* — Kevin Andrew Johnston
(74) *Attorney, Agent, or Firm* — Sughrue Mion, PLLC

(57) ABSTRACT

A mechanical part (2, 3) including a functional surface intended to come into frictional contact with another functional surface, wherein the functional surface of the mechanical part (2, 3) is made of polyethylene furanoate.

6 Claims, 2 Drawing Sheets

FUNCTIONAL MECHANICAL PART

CROSS REFERENCE TO RELATED APPLICATIONS

The present application is based on, and claims priority from the prior European Patent Application No. 22214742.3, filed on Dec. 19, 2022, the entire contents of which are incorporated herein by reference.

TECHNICAL FIELD OF THE INVENTION

The present invention relates to a mechanical part comprising a functional surface intended to come into frictional contact with another functional surface during use.

TECHNOLOGICAL BACKGROUND

In the 1970s, Tissot introduced Astrolon, the first plastic watch provided with components within the movement, including in particular the Swiss lever escapement which is made of polymer. The initial specifications for this watch were simple:

Reduce the number of components in the movement,

Eliminate the need for lubrication,

Improve the production process.

The manufacturing method is thus that of injection moulding, and polymers, thanks to their properties, meet these needs and allowed this watch to be produced. The Swiss patent document CH 334708 describes the injection method and the material selected, which is polyamide 66 (PA66).

In the 2000s, Swatch introduced Sistem51, which was substantially based on the same specifications. The injection method remains the same, but the polymer selected is polyoxymethylene (POM). Very fine lubrication of the escapement allows the movement to achieve the required performance levels.

Efforts are still being made to this day to improve tribological performance. Moreover, these polymer materials, such as POM, which are known for their tribological performance, have the drawback of being petroleum-based and difficult to recycle.

SUMMARY OF THE INVENTION

The purpose of the present invention is to find a polymer material with improved tribological performance compared with POM.

Another purpose of the present invention is to find a biosourced alternative, i.e. an alternative of non-petroleum origin, to the materials commonly used for tribological applications.

Numerous tests conducted for this purpose have brought to light a polymer, polyethylene furanoate (PEF).

More specifically, the present invention relates to a mechanical part comprising a functional surface intended to come into frictional contact with another functional surface, said at least one functional surface of the mechanical part being made of polyethylene furanoate (PEF).

The mechanical properties of PEF are similar to those of POM and like POM, PEF can be injected, but it has the added advantage of being biosourced and recyclable. Tribological tests have shown that the use of the polymer PEF for horological parts inter alia, improves performance for lubricated contacts, reducing the average dynamic coefficient of friction compared with POM, without affecting wear from this contact.

Another aspect of the invention relates to a functional assembly comprising the mechanical part as described hereinabove and another mechanical part comprising a functional surface intended to be in frictional contact with the functional surface of said mechanical part, said assembly being characterised in that at least the functional surface of the other part is made of a material selected from polyethylene furanoate, ruby and steel.

Other features and advantages of the invention will be better understood upon reading the following detailed description given with reference to the accompanying drawings.

DETAILED DESCRIPTION OF THE INVENTION

Figure 3:
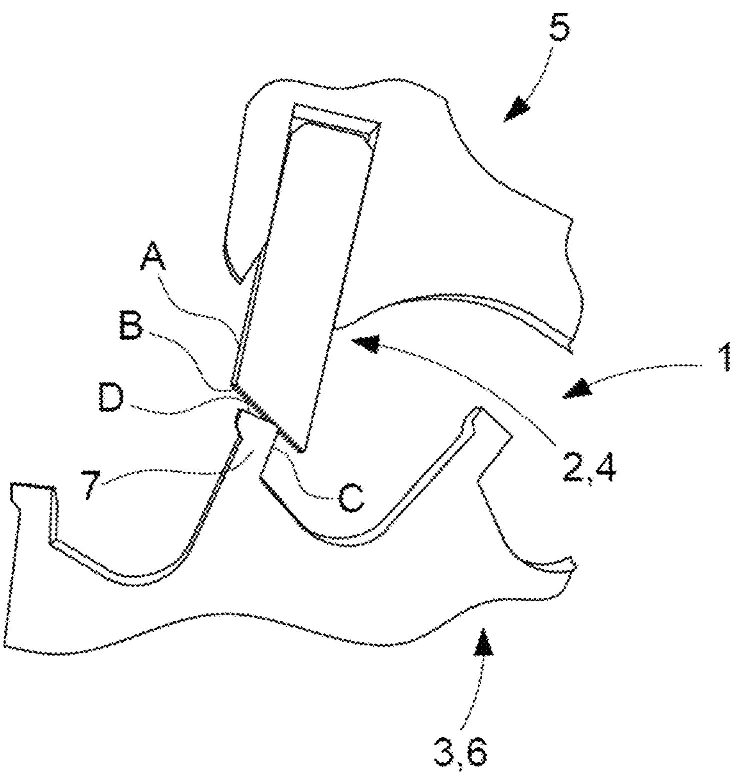
FIG. 3 partially shows a functional assembly comprising two parts, specifically an escape wheel and a pallet of a pallet-lever with a wheel made of PEF according to the invention.

The present invention relates to a mechanical part which, on one or more of its so-called functional or contact surfaces, is subject to friction with one or more functional surfaces of another part or of the same part. The mechanical part can be used in any system where friction is a concern. Applications can include automotive or electronic parts, etc. More specifically, it could be a part used in the horological field, and could in particular be a part of the movement. Examples of parts include a pallet, an escape wheel, an arbor of a wheel set, a bearing, a mainspring and toothings of gear wheels. Said part can be in contact with another part. By way of example, in the horological field, the functional assembly 1 shown in FIG. 3 can include a first part 2, which is a pallet 4 of a pallet-lever 5, and a second part 3, which is an escape wheel 6. More specifically, the pallet 4 has a rest plane A and an impulse plane B which cooperate with the rest plane C and impulse plane D of the tooth 7 of the escape wheel 6. These planes A, B, C and D are highly-stressed functional surfaces subject to high levels of friction and/or contact, which requires special materials to be used in order to reduce friction. Typically, the wheel at least is made of PEF to improve tribological performance. Alternatively, one functional surface of a part can be in contact with another functional surface of the same part. For example, this can be a mainspring formed by a blade with one face of the spring intended to be in contact with another face of the spring.

Figure 1:
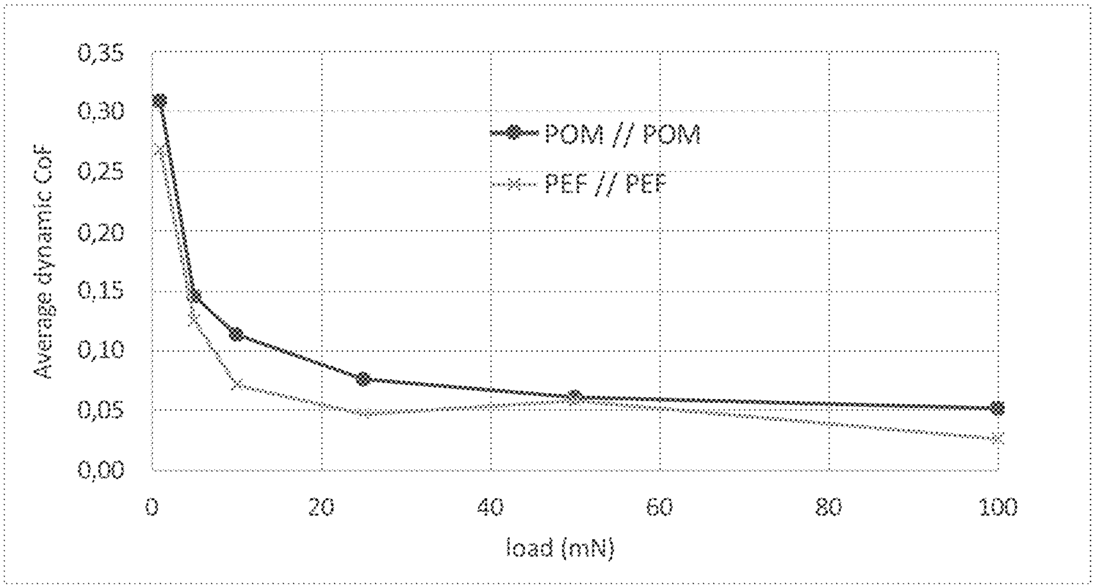
FIG. 1 shows the curves of the average dynamic coefficient of friction as a function of load for the PEF/PEF pair and the POM/POM pair.

According to the invention, the mechanical part is at least in part made of polyethylene furanoate (PEF). In this way, at least the one or more functional surfaces are made of PEF. Preferably, the part is made as a whole from PEF. Comparative tribological tests with POM have been carried out and the results are shown in FIG. 1. The tests were carried out with a contact lubricated using watchmaker's oil using a ball-on-flat tribometer in alternating linear mode with a 2 mm diameter ball, the ball and the flat being made of PEF for one pair and of POM for the other pair. The tests were carried out with a maximum sine wave speed of 10 mm/s, an amplitude of 4 mm, and a normal force of 1, 5, 10, 25, 50 and 100 mN over a distance of 15 m. The loads were swept over a wide range to represent the different possible contacts in the movement and in particular the evolution of the escapement contact during the different release and impulse phases.

The coefficient of friction (CoF) of the PEF/PEF pair is seen to be at least equivalent if not lower than that of the POM reference. As soon as the load is sufficient, the oil reduces the CoF to the extremely low values typically found for hydrodynamic friction. Use of PEF allows the CoF to be reduced even further and obtains values below 0.05. Moreover, with an improved coefficient of friction, no deterioration in wear was observed.

Figure 2:
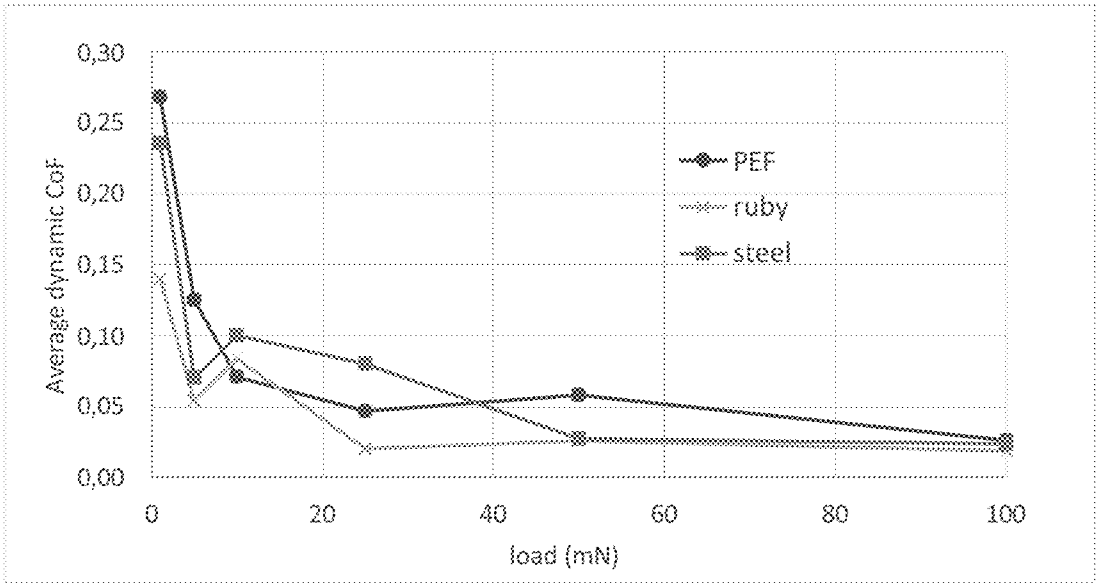
FIG. 2 shows the curves of the average dynamic coefficient of friction as a function of load for the PEF/PEF pair, the PEF/ruby pair and the PEF/steel pair.

Friction with other antagonists that are typically used in the horological industry, specifically ruby and steel, was assessed under the same testing conditions, with the ball being made of these materials during the tests. The results are shown in FIG. 2, with the PEF/PEF pair given for comparison. In general, the CoF is even lower because the elastic deformations of the antagonist are limited, thus limiting frictional forces. The values achieved are well below 0.05 over a fairly wide range of loads. The hardness of these antagonists and the use of a high load do not deteriorate the PEF and no wear can be seen.

In conclusion, the results of the tribological tests carried out on parts made of PEF are at least as good as those carried out on parts made of POM.

The invention claimed is:

1. A horological movement, comprising:

a first mechanical part having a first functional surface; and a second mechanical part having a second functional surface, wherein the first and second mechanical parts are moving parts of the horological movement, wherein the first functional surface of the first mechanical part frictionally contacts the second functional surface of the second mechanical part as the first mechanical part drives the second mechanical part, and wherein the first functional surface is made of polyethylene furanoate.

2. The horological movement according to claim 1, wherein the entire first mechanical part is made of polyethylene furanoate.

3. The horological movement according to claim 1, wherein the first mechanical part is a pallet, an escape wheel, an arbor of a wheel set, a bearing, a mainspring and toothings of gear wheels.

4. The horological movement according to claim 1, wherein the second functional surface of the second mechanical part is made of a material selected from polyethylene furanoate, ruby and steel.

5. The horological movement according to claim 4, wherein the frictional contact is lubricated.

6. The horological movement according to claim 5, wherein the frictional contact is lubricated using an oil.

* * * * *